W. P. PENN.
Grain Drill.

No. {1,920, 32,924.}

Patented July 30, 1861.

Witnesses:

Inventor:

UNITED STATES PATENT OFFICE.

W. P. PENN, OF BELLEVILLE, ILLINOIS.

IMPROVEMENT IN SEEDING-PLOWS.

Specification forming part of Letters Patent No. 32,924, dated July 30, 1861.

*To all whom it may concern:*

Be it known that I, WORDEN P. PENN, of Belleville, in the county of St. Clair and State of Illinois, have invented a new and useful Improvement in Gang-Plows with a Seeding Attachment; and I do hereby declare that the following is a full, clear, and exact description of the same, reference being had to the annexed drawings, making a part of this specification, and to the letters of reference marked thereon.

The nature of my invention consists in constructing a gang of plows with a seeding attachment in such a manner that the quantity of seed sown may be controlled while the machine is in operation, and when it is desired to throw the plows out of the earth it may be done by a single operation, which also, and at the same time, entirely stops the sowing of the seed.

To enable others to make and use my invention, I will proceed to describe its construction and operation.

Figure 1:
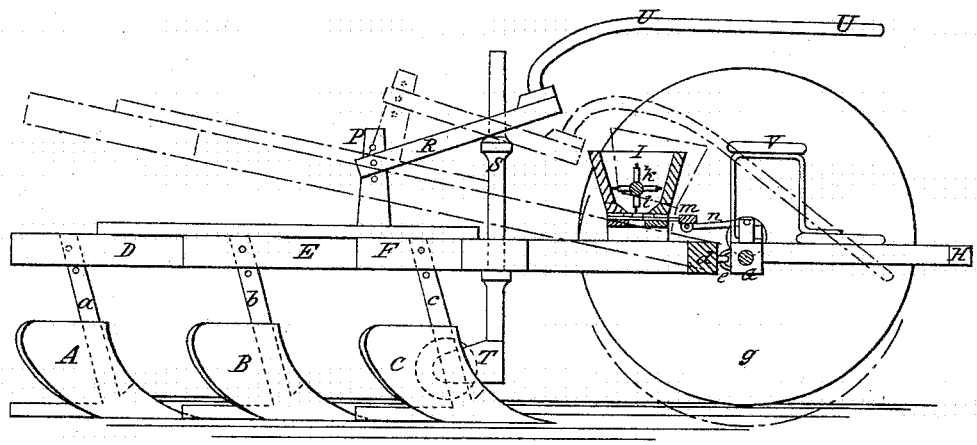
Figure 2:
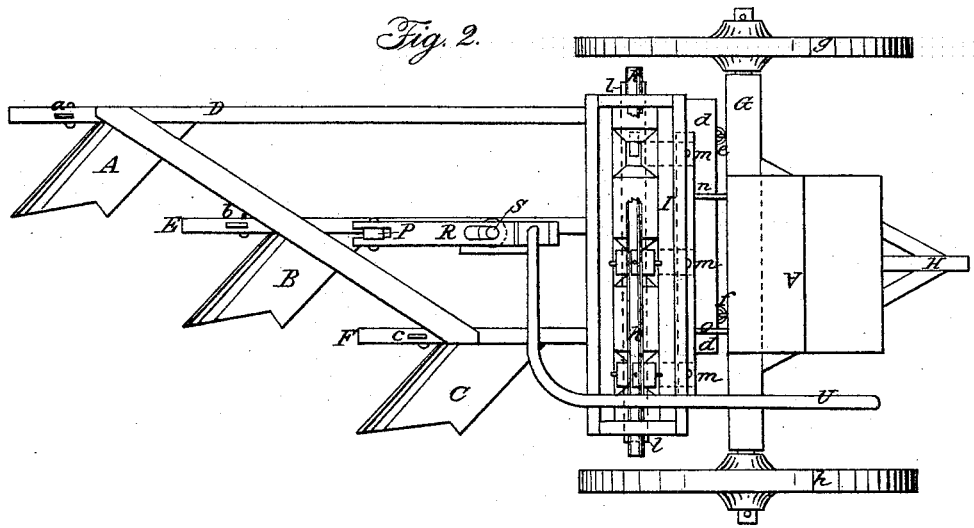

Figure 1 of the drawings represents a side elevation of a gang of three plows with one of the truck-wheels removed and the seed-hopper in section. Fig. 2 is plan of the same.

A, B, and C are plows attached by their respective standards *a*, *b*, and *c* to the longitudinal pieces D, E, and F of the frame. The standards have holes, by which they are bolted to the frame, and by which also the depth of ground reached by the plows may be regulated. The longitudinal plow-beams D E F have a diagonal bracing their rear ends, and are framed at their front ends into the cross-beam *d*, which is hinged at *e* and *f* to the axle-beam G, carrying the driver's seat V, the tongue H, and the wheels *g* and *h*. The position of the wheel *h*, traveling in the furrow, is indicated in Fig. 1 by dotted lines.

I is a seed-hopper built on the rear portion of the frame, with seed-openings in the bottom beveled from the inside to facilitate the passage of the seed. The seed is kept from clogging over the openings by the beaters on the shaft *k*, which may be caused to rotate by gearing or belting from the hub of one of the truck-wheels. Under the hopper is a regulating slide-plate, *l*, extending its whole length, and having seed-openings corresponding with those in the bottom of the hopper. By shifting this plate endwise the size of the openings may be graduated for the passage of the seed as may be desired. There are also three transverse slides, *m*, under the hopper, working below the long slide and connected to a cross-bar, which is jointed by the pitmen-rods *n* and *o* to small standards on the axle-beam G. When the rear portion of the frame carrying the plows and hopper is tilted up on the hinges or joints *e* and *f*, the seed-slides *m* are pushed in by the pitmen-rods, and thus close the seed-openings entirely.

The rear frame carries a standard, P, to which is jointed a lever, R, that bears upon a collar of the upright shaft S. This shaft supports the frame on another collar, and rests on a caster or roller, T, which travels on the ground, and it is held in position by an appropriate journal-cap on the frame. By pressing down the long bent handle U of the lever R the rear portion of the frame is lifted by the standard P, and tilted on the hinges *e* and *f*, with the collar on the upright shaft S operating as a fulcrum. The standard has several holes by which the lever may be adjusted.

It will be seen from the foregoing description that the driver occupying the seat of the machine may readily lift the plows out of the ground, and at the same time shut off the seed, by simply depressing the lever at his side. In a similar manner the plows may be dropped and the seed-slides opened simultaneously by raising the lever.

The red lines of the drawings illustrate the relative positions of the lever and the frame carrying the plows and seed-hopper, when the plows are raised above the ground and the seed-openings are closed.

What I claim as my invention, and desire to secure by Letters Patent, is—

The gang-plow frame D E F, with the hopper I arranged thereon, standard P, lever R, and shaft S, in combination with the transverse slides *m* and rods *n*, by means of which the flow of seed from the hopper is stopped by the elevation of the gang of plows, as described.

W. P. PENN.

Witnesses:
F. D. BELCOUR,
A. J. FARIS.